(12) United States Patent
Huang et al.

(10) Patent No.: US 11,246,192 B2
(45) Date of Patent: Feb. 8, 2022

(54) MICROWAVE OVEN WITH FULL GLASS DOOR

(71) Applicant: WHIRLPOOL CORPORATION, Benton Harbor, MI (US)

(72) Inventors: Vince Huang, Shenzhen (CN); Dick Ge, Benton Harbor, MI (US); Shirley Mao, Benton Harbor, MI (US); Fly Xie, Benton Harbor, MI (US)

(73) Assignee: WHIRLPOOL CORPORATION

( * ) Notice: Subject to any disclaimer, the term of this patent is extended or adjusted under 35 U.S.C. 154(b) by 270 days.

(21) Appl. No.: 16/311,064

(22) PCT Filed: Dec. 6, 2016

(86) PCT No.: PCT/CN2016/108676
§ 371 (c)(1),
(2) Date: Dec. 18, 2018

(87) PCT Pub. No.: WO2018/102983
PCT Pub. Date: Jun. 14, 2018

(65) Prior Publication Data
US 2019/0215917 A1    Jul. 11, 2019

(51) Int. Cl.
*H05B 6/76* (2006.01)
*H05B 6/64* (2006.01)
*F24C 7/02* (2006.01)
*C03C 17/245* (2006.01)
*F24C 15/04* (2006.01)

(52) U.S. Cl.
CPC ......... *H05B 6/766* (2013.01); *C03C 17/2453* (2013.01); *F24C 7/02* (2013.01); *F24C 15/04* (2013.01); *H05B 6/6414* (2013.01); *C03C 2217/24* (2013.01); *C03C 2217/256* (2013.01)

(58) Field of Classification Search
CPC ............ C03C 17/2453; C03C 2217/24; C03C 2217/256; F24C 15/04; F24C 7/02; H05B 6/6414; H05B 6/766
USPC ............... 219/740, 754, 405, 757, 738, 739, 219/741–744; 126/200, 198; 174/381, 174/382, 371, 389, 35 R, 35 MS, 35 GC
See application file for complete search history.

(56) References Cited

U.S. PATENT DOCUMENTS

| 3,430,023 | A | 2/1969 | Tingley |
| 4,049,939 | A * | 9/1977 | Katona ................... F24C 15/04 219/740 |
| 6,429,370 | B1 | 8/2002 | Norte et al. |

(Continued)

FOREIGN PATENT DOCUMENTS

| CN | 1623293 | | 8/2004 |
| CN | 101215409 | A * | 7/2008 |
| CN | 203431951 | | 2/2014 |

(Continued)

*Primary Examiner* — Quang T Van
(74) *Attorney, Agent, or Firm* — Price Heneveld LLP

(57) ABSTRACT

A microwave oven (2) with a full glass door (12) for preventing microwave leakage from the cooking cavity (6) of the microwave oven (2) is provided. The front plate (8) of the cooking cavity (6) has a conductive material (10), such as a rubber with conductive filler. The inner glass surface (16) of the door (12) has a conductive coating that creates a ground loop with the conductive material (10) on the front plate (8) of the cooking cavity (6) to prevent microwave leakage from the cooking cavity (6).

20 Claims, 4 Drawing Sheets

(56) References Cited

U.S. PATENT DOCUMENTS

2009/0255524 A1* 10/2009 Venezia .............. F24C 15/024
126/198
2010/0051908 A1* 3/2010 Snaith .............. H01L 51/0059
257/40

FOREIGN PATENT DOCUMENTS

| CN | 105042654 | | | 11/2015 | | |
|---|---|---|---|---|---|---|
| CN | 204987134 | | | 1/2016 | | |
| CN | 106103555 | | | 11/2016 | | |
| CN | 109416182 | | | 3/2019 | | |
| EP | 0008526 | A1 | * | 3/1980 | ............ | H05B 6/763 |
| FR | 1866651 | | | 8/2005 | | |
| FR | 2866651 | | | 8/2005 | | |
| FR | 2976651 | | | 12/2012 | | |
| GB | 1424888 | | | 2/1976 | | |
| JP | 2015048465 | A | * | 3/2015 | | |
| KR | 20010057083 | A | * | 7/2001 | ............ | F24C 15/024 |
| WO | 201514355 | | | 10/2015 | | |
| WO | 2016144312 | | | 9/2016 | | |
| WO | 2016190589 | | | 12/2016 | | |

* cited by examiner

MICROWAVE OVEN WITH FULL GLASS DOOR

CROSS REFERENCE TO FOREIGN PRIORITY DOCUMENT

The present application claims the benefit under 35 U.S.C. §§ 119, 365, and/or 386 of International Application No. PCT/CN2016/108676 filed Dec. 6, 2016.

BACKGROUND

Generally, a microwave oven is an electrically powered apparatus which uses high frequency electromagnetic waves—microwaves—to heat and/or cook an item within a cavity of the microwave oven. While the microwaves are useful to heat and/or cook an item within the cavity, it is important to prevent harmful levels of microwave radiation from escaping the cavity and potentially harming people in the vicinity of the oven.

Microwave oven doors typically use metal to prevent microwave leakage from the cooking cavity. These metal plates cause the door to be thick and heavy and limits the transparency of all or portions of the door. Thus, it is desirable to have a microwave oven with a door that is thinner, lighter, and more transparent.

SUMMARY OF THE INVENTION

One aspect of the present invention is a microwave oven with a housing, a cooking cavity, at least one radiant unit for delivering microwave energy, and a door. A conductive material is included on the front plate of the cooking cavity. The door includes a frame with an inner glass surface and an outer glass surface. The inner glass surface includes a conductive coating that contacts the conductive material on the front plate of the cavity when the door is closed, creating a ground loop for the door.

Another aspect of the present invention is a door for a microwave oven. The door includes a frame with an outer glass surface and an inner glass surface. The inner glass surface has a conductive coating that contacts a conductive material on the microwave oven when the door is closed, creating a ground loop for the door.

Yet another aspect of the present invention is a method of creating a ground loop for a microwave oven. The method includes coupling a conductive material to the front plate of the cooking cavity of the microwave oven. The method also includes coating a conductive material on an inner glass surface of the door for the microwave oven. The coating step includes coating the conductive material in a pattern to create a ground loop with the conductive material on the front plate of the cooking cavity when the door is closed.

These and other features, advantages, and objects of the present invention will be further understood and appreciated by those skilled in the art upon studying the following specification, claims, and appended drawings.

DETAILED DESCRIPTION OF THE PREFERRED EMBODIMENTS

Figure 1:
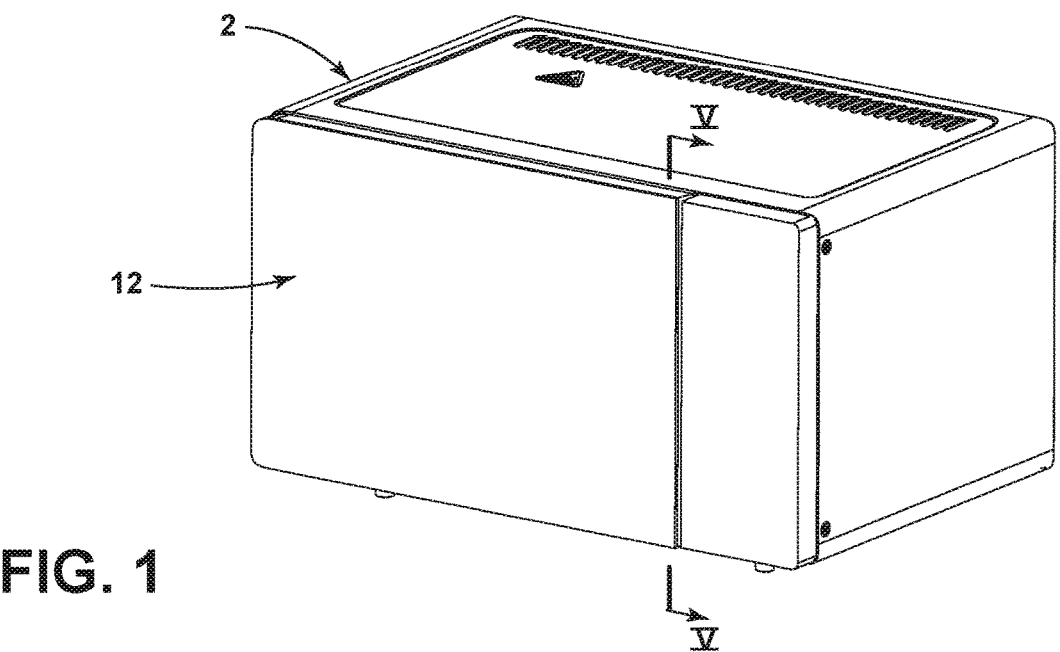
FIG. 1 is a front perspective view of a microwave oven according to an embodiment of the present concept.
Figure 2:
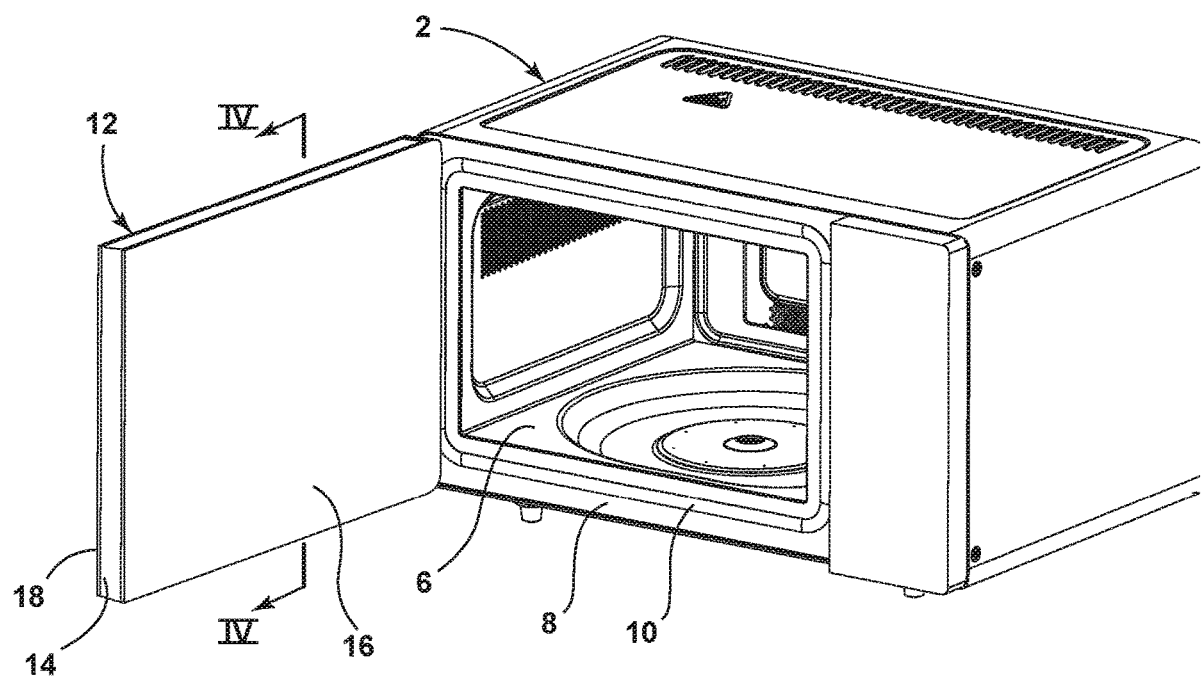
FIG. 2 is a front perspective view of the microwave oven of FIG. 1 with the door open.
Figure 3:
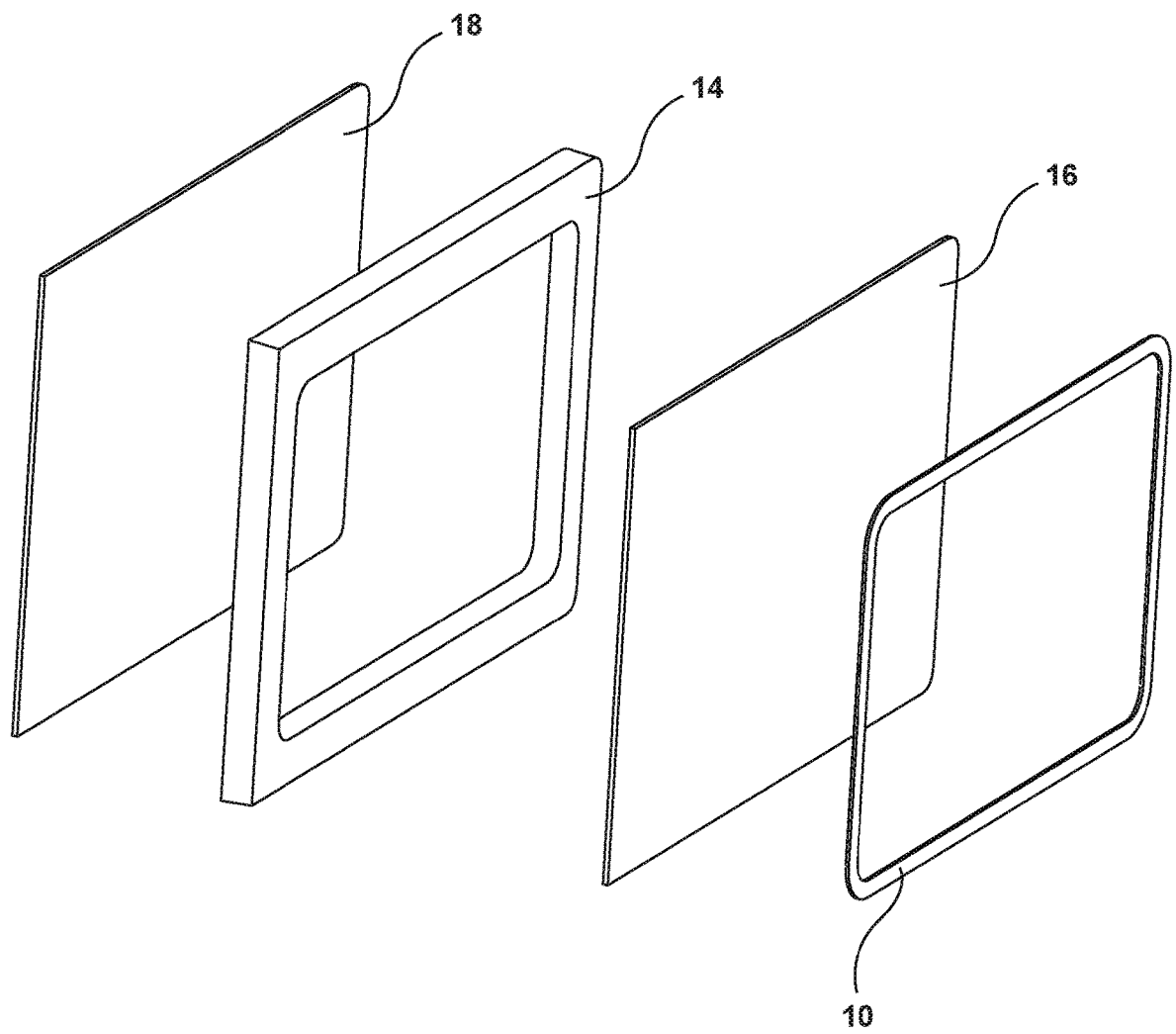
FIG. 3 is an exploded view of the microwave door and conductive material according to an embodiment of the present invention.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

With reference to the drawings, a microwave oven 2 includes a cooking cavity 6. The cooking cavity 6 has a front plate 8. As shown in the drawings, the front plate 8 can have a generally rectangular shape.

A conductive material 10 is coupled to the front plate 8 of the cooking cavity 6. The conductive material 10 can be any conductive material that is adhered to, mechanically held by, or otherwise coupled to, the front plate 8. In the illustrated embodiment, the conductive material 10 is a generally rectangular bead of conductive rubber. The conductive rubber can be silicone rubber, ethylene propylene diene monomer (EPDM), etc. The conductive filler in the conductive rubber can be a metal material, such as particles and/or fibers of silver, nickel, etc. The conductive filler can also be an inorganic nonmetal particle and/or fiber, such as conductive carbon black, carbon fiber, carbon nanotube, etc. In addition, the conductive filler can include a combination of metal and inorganic materials. The conductive material can also be another compound, such as a conductive thermoplastic elastomer (TPE), with a similar conductive filler.

The conductive rubber, conductive TPE, or similar conductive material can be injected or extruded into a gap in the front plate 8 of the cooking cavity 6. As described above, the conductive material can also be adhered to, mechanically attached, or otherwise coupled to the front plate 8. If a gap is used as part of the coupling, the conductive material can have a thickness of approximately 0.4-0.6 mm.

Figure 4:
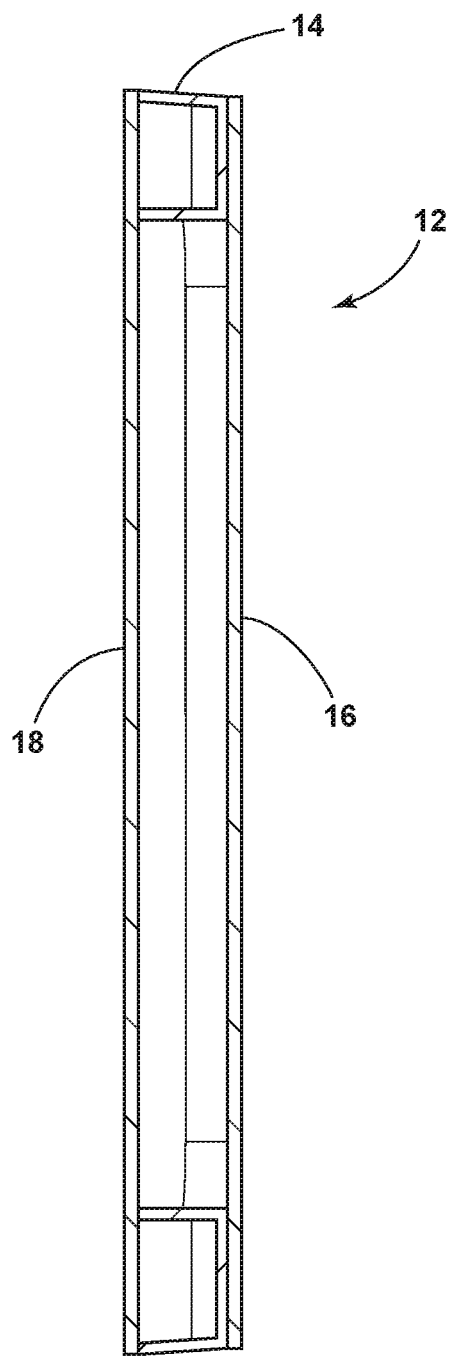
FIG. 4 is a cross-sectional view of the microwave door, taken along line IV-IV as shown in FIG. 2.

The microwave oven 2 has a door 12 that is attached to the housing 4 and/or front plate 8 of the cooking cavity 6. The microwave oven door 12 can be attached by a hinge(s) or other coupling mechanism. The door 12 has a frame 14 with an inner glass surface 16 and an outer glass surface 18 coupled to the frame 14. The frame 14 can be a plastic material, such as acrylonitrile-butadiene-styrene (ABS), polycarbonate (PC), other plastic, and/or combinations thereof. The glass surfaces 16, 18 can be coupled to the frame 14 by an adhesive, by a mechanical fastener, by a mechanical connection of portions of the glass surfaces 16, 18 to the frame 14, as shown in FIG. 4, or by other coupling.

The inner glass surface 16 includes a conductive coating. The conductive coating can be printed on, adhered to, sputtered on, coated, or otherwise coupled to the inner glass surface 16. The conductive coating can be any conductive material, such as fluorine doped tin oxide, indium doped tin oxide, zinc oxide, silver coatings, double and triple silver stacks, carbon nanotubes, graphine latter, and/or combinations thereof. In addition, both sides of the inner glass surface 16 can have a conductive coating. Thus, for example, one side could have a fluorine doped tin oxide, while the other has a silver coating. However, both sides of the inner glass surface 16 could have the same coating, if coating is done on both sides of the inner glass surface 16. The conductive coating is in a pattern that overlaps the conductive material 10 coupled to the front plate 8 when the door 12 is closed. Thus, one or both sides of the inner glass surface 16 can be fully coated with a conductive coating. If the conductive coating has a protective overcoat, then the conductive electrical coating underneath the outer coat will need to be exposed or otherwise connected, for example, through the use of an ultrasonic soldering iron, in the area that will contact the conductive material 10 on the front plate 8 when the door 12 is closed.

The conductive coating can be generally transparent or semi-transparent. Ideally, the door 12 permits viewing of the inside of the cooking cavity 6 when the door 12 is closed. This is especially important for when the microwave oven 2 is in use for heating and/or cooking something within the cooking cavity 6. Thus, the inner glass surface 16 and the outer glass surface 18 should combine to permit a transparent and/or semi-transparent portion to allow the viewing of the inside of the cooking cavity 6. This can be accomplished, for example, with the assistance of a light (not shown) when the microwave oven 2 is in operation.

Figure 5:
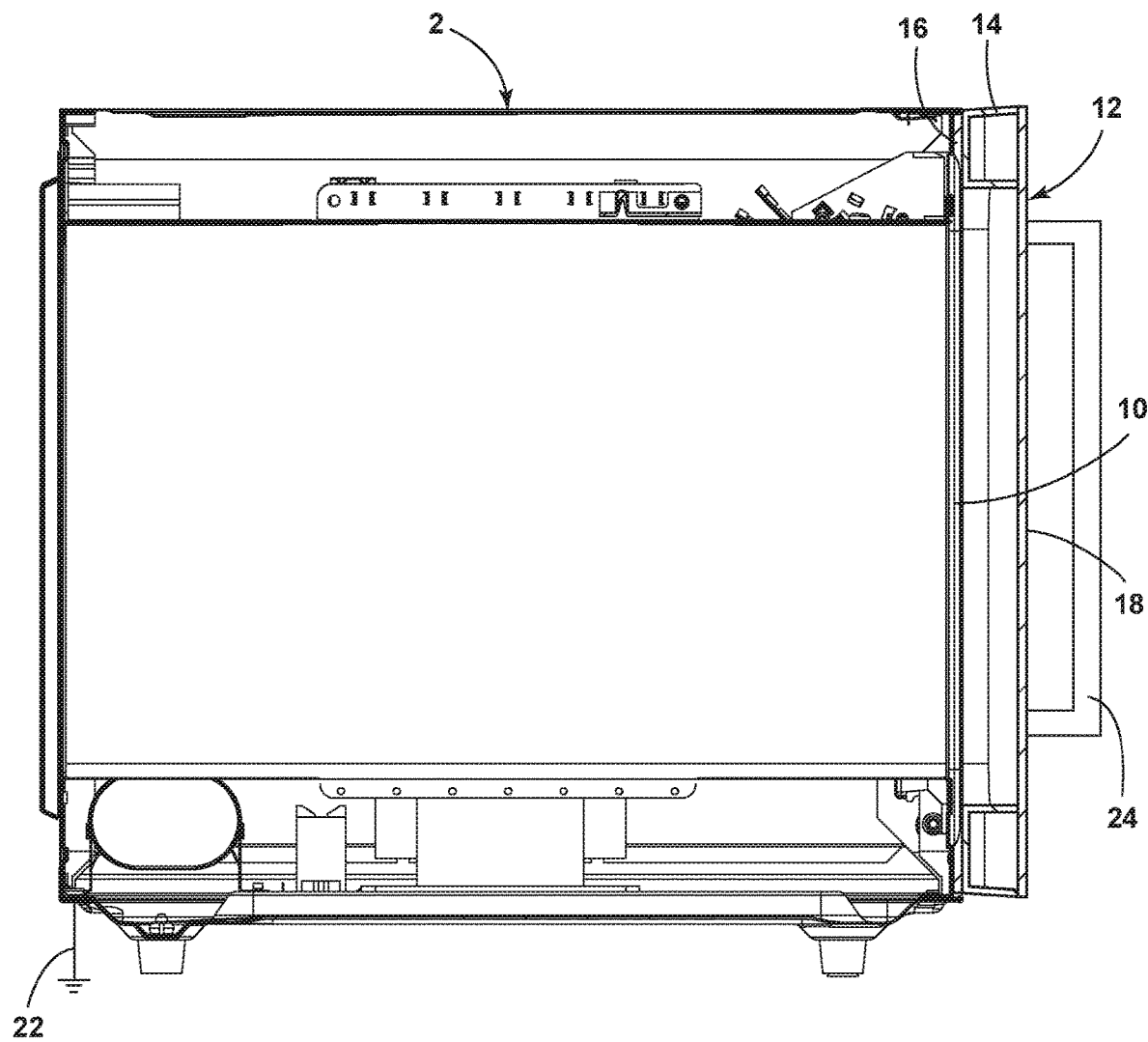
FIG. 5 is a side cross-sectional view of the microwave oven taken along line V-V as shown in FIG. 1.

A handle 24, shown in FIG. 5, can optionally be added to assist in the opening and closing of door 12. In addition, when the door 12 is closed, the conductive coating on the inner glass surface 16 of the door 12 creates a ground loop with the conductive material 10 on the front plate 8 of the cooking cavity 6 to prevent microwave leakage from the cooking cavity 6. The microwave oven 2 can have a ground 22 that extends from or is coupled from the microwave oven 2.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. A microwave oven, comprising:
   a housing;
   a cooking cavity with a generally rectangular conductive material on the front plate of the cavity; and
   a door comprising:
     a frame;
     an outer glass layer coupled to the frame;
     an inner glass layer with a coating of conductive material at an inner surface thereof coupled to the frame; and
     wherein said conductive coating on said inner glass layer directly contacts said conductive material on the front plate of the cavity when the door is closed, creating a ground loop for the door, with the edges of said inner glass layer extending beyond the edges of said conductive material.

2. The microwave oven of claim 1, wherein said conductive material on the front plate is conductive rubber.

3. The microwave oven of claim 2, wherein said conductive rubber comprises silicone rubber with a conductive filler.

4. The microwave oven of claim 1, wherein said conductive coating on said inner glass layer is put on both sides of the inner glass layer.

5. The microwave oven of claim 1, wherein said conductive material surrounds the entire periphery of the cavity opening in the front plate of the cavity.

6. The microwave oven of claim 5, wherein said conductive material is a generally rectangular bead of conductive rubber.

7. The microwave oven of claim 6, wherein said conductive coating on said inner glass layer comprises fluorine doped tin oxide.

8. The microwave oven of claim 7, wherein said door frame comprises a polymeric material.

9. The microwave oven of claim 8, wherein said door frame comprises a polycarbonate material.

10. A door for a microwave oven, comprising:
a frame;
an outer glass layer coupled to the frame;
an inner glass layer with a conductive coating at an inner surface thereof coupled to the frame; and
wherein said conductive coating on said inner glass layer directly contacts a generally rectangular conducive material on the microwave oven when the door is closed, creating a ground loop for the door, with the edges of said inner glass layer extending beyond the edges of said conductive material.

11. The door for a microwave oven of claim 10, wherein said conductive coating is on both sides of said inner glass layer.

12. The door for a microwave oven of claim 11, wherein said conductive coating on one side of said inner glass layer comprises fluorine doped tin oxide.

13. The door for a microwave oven of claim 12, wherein said conductive coating the other side of said inner glass layer comprises silver.

14. The door for a microwave oven of claim 10, wherein said frame comprises a polycarbonate material.

15. The door for a microwave oven of claim 14, wherein said conductive frame comprises acrylonitrile-butadiene-styrene.

16. The door for a microwave oven of claim 10, wherein said conductive material comprises rubber with a conductive filler.

17. The door for a microwave oven of claim 16, wherein said rubber comprises silicone.

18. A method for creating a ground loop for a microwave oven, which comprises a door, the door comprising a frame, an outer glass layer coupled to the frame, and an inner glass layer coupled to the frame, the method comprising:
coupling a generally rectangular conductive material on the front plate of the cooking cavity of the microwave oven; and
making a coating of conductive material on an inner surface of the inner glass layer of the door for the microwave oven to directly contact with the conductive material on the front plate of the cooking cavity so as to create a ground loop for the door when the door is closed, with the edges of said inner glass layer extending beyond the edges of said conductive material.

19. The method for creating a ground loop for a microwave oven of claim 18, wherein the conductive material on the front plate comprises a rubber material with a conductive filler.

20. The method for creating a ground loop for a microwave oven of claim 19, wherein the coating step utilizes a tin oxide material.

* * * * *